(12) United States Patent
Saito et al.

(10) Patent No.: US 9,381,889 B2
(45) Date of Patent: Jul. 5, 2016

(54) ANTENNA CORE AND METHOD OF MANUFACTURING THE SAME, AND ANTENNA AND DETECTION SYSTEM USING THE SAME

(71) Applicants: Kabushiki Kaisha Toshiba, Minato-ku (JP); Toshiba Materials Co., Ltd., Yokohama-shi (JP)

(72) Inventors: Tadao Saito, Yokohama (JP); Katsuhiko Yamada, Yokohama (JP); Kazumi Sakai, Yokohama (JP)

(73) Assignees: KABUSHIKI KAISHA TOSHIBA, Minato-ku (JP); TOSHIBA MATERIALS CO., LTD., Yokohama-shi (JP)

( * ) Notice: Subject to any disclaimer, the term of this patent is extended or adjusted under 35 U.S.C. 154(b) by 127 days.

(21) Appl. No.: 14/519,948

(22) Filed: Oct. 21, 2014

(65) Prior Publication Data
US 2015/0035647 A1 Feb. 5, 2015

Related U.S. Application Data

(60) Division of application No. 13/165,847, filed on Jun. 22, 2011, now Pat. No. 8,902,067, which is a continuation of application No. PCT/JP2009/007045, filed on Dec. 21, 2009.

(30) Foreign Application Priority Data

Dec. 22, 2008 (JP) .................................. 2008-325826

(51) Int. Cl.
*G08B 13/14* (2006.01)
*B60R 25/24* (2013.01)
(Continued)

(52) U.S. Cl.
CPC ............ *B60R 25/24* (2013.01); *G07C 9/00007* (2013.01); *H01F 1/15316* (2013.01);
(Continued)

(58) Field of Classification Search
CPC .......... H01Q 7/06; H01Q 7/08; H01Q 1/243; H01Q 1/38; H01Q 7/00; H01Q 1/2225; H01Q 17/00
USPC .................................. 343/787, 788; 340/572.7
See application file for complete search history.

(56) References Cited

U.S. PATENT DOCUMENTS

| | | | | |
|---|---|---|---|---|
| 4,851,610 A | * | 7/1989 | LeBlanc | ................ G06K 19/02 150/147 |
| 5,268,043 A | * | 12/1993 | McCowen | ............. G06K 7/083 148/310 |

(Continued)

FOREIGN PATENT DOCUMENTS

| | | |
|---|---|---|
| CN | 1075672 C | 11/2001 |
| CN | 1871673 A | 11/2006 |

(Continued)

OTHER PUBLICATIONS

Office Action issued Mar. 31, 2015 in Japanese Patent Application No. 2014-112283 (with English language translation).

(Continued)

*Primary Examiner* — Jennifer Mehmood
*Assistant Examiner* — Rufus Point
(74) *Attorney, Agent, or Firm* — Oblon, McClelland, Maier & Neustadt, L.L.P.

(57) ABSTRACT

An antenna core includes a laminate of a plurality of Co-based amorphous magnetic alloy thin strips in which a length ratio of a long axis to a short axis is greater than 1. 60% or more of the Co-based amorphous magnetic alloy thin strips in terms of the number of the thin strips as percentage have a line-shaped mark formed along the long axis on at least one surface thereof. An antenna includes the antenna core and a winding wound around the antenna core along the long axis.

14 Claims, 5 Drawing Sheets

(51) Int. Cl.
*H01F 1/153* (2006.01)
*H01F 3/10* (2006.01)
*H01F 41/02* (2006.01)
*H01Q 1/32* (2006.01)
*H01Q 7/06* (2006.01)
*G07C 9/00* (2006.01)

(52) U.S. Cl.
CPC .............. *H01F 1/15366* (2013.01); *H01F 3/10* (2013.01); *H01F 41/0226* (2013.01); *H01Q 1/3241* (2013.01); *H01Q 7/06* (2013.01); *Y10T 29/49016* (2015.01)

(56) References Cited

U.S. PATENT DOCUMENTS

| | | | | |
|---|---|---|---|---|
| 5,567,537 | A * | 10/1996 | Yoshizawa | G06K 19/07749 343/787 |
| 6,577,228 | B1 | 6/2003 | Tsuchid et al. | |
| 6,771,070 | B2 * | 8/2004 | Lee | G01R 33/3456 324/318 |
| 6,891,507 | B2 * | 5/2005 | Kushihi | H01Q 1/22 29/600 |
| 6,980,171 | B2 | 12/2005 | Maruyama et al. | |
| 7,088,304 | B2 * | 8/2006 | Endo | G06K 19/0726 343/788 |
| 7,508,350 | B2 * | 3/2009 | Hein | B82Y 25/00 343/787 |
| 8,902,067 | B2 * | 12/2014 | Saito | H01F 1/15316 29/600 |
| 2005/0007296 | A1 * | 1/2005 | Endo | G06K 19/0726 343/895 |
| 2007/0040643 | A1 | 2/2007 | Inoue et al. | |
| 2007/0279299 | A1 * | 12/2007 | Aoyama | H01Q 1/243 343/702 |
| 2008/0117115 | A1 * | 5/2008 | McLean | H01Q 11/10 343/792.5 |
| 2013/0306744 | A1 * | 11/2013 | Li | C21D 8/0205 235/493 |

FOREIGN PATENT DOCUMENTS

| | | |
|---|---|---|
| DE | 195 13 607 A1 | 10/1995 |
| EP | 1 006 028 A2 | 6/2000 |
| EP | 1 067 567 A1 | 1/2001 |
| EP | 1 679 727 A1 | 7/2006 |
| EP | 1 349 236 B1 | 8/2006 |
| EP | 2 003 621 A2 | 12/2008 |
| EP | 2 139 011 A1 | 12/2009 |
| GB | 2 169 147 A | 7/1986 |
| JP | 11-183578 A | 7/1999 |
| JP | 2000-160897 | 6/2000 |
| JP | 2000-284027 | 10/2000 |
| JP | 2003-283231 | 10/2003 |
| JP | 2004-119403 | 4/2004 |
| JP | 2004-179803 A | 6/2004 |
| JP | 2006-304080 A | 11/2006 |
| JP | 2007-329143 | 12/2007 |
| JP | 2008-252462 A | 10/2008 |
| WO | WO/00/45400 A1 | 8/2000 |
| WO | WO 2005/041224 A1 | 6/2005 |
| WO | WO 2008/133026 A1 | 11/2008 |

OTHER PUBLICATIONS

Office Action issued May 19, 2015 in Japanese Patent Application No. 2010-543832 (with English language translation).
Japanese Office Action issued Jan. 6, 2015 in Patent Application No. 2014-112283 (with English Translation).
International Search Report mailed Apr. 6, 2010 issued in PCT/JP2009/007045 filed Dec. 21, 2009.
International Written Opinion mailed Apr. 6, 2010 for PCT/JP2009/007045 filed Dec. 21, 2009.
Extended European Search Report Issued Oct. 1, 2012 in Patent Application No. 09834389.0.
Combined Chinese Office Action and Search Report issued Mar. 3, 2014 in Patent Application No. 200980152979.1 with English Translation of Category of Cited Documents.

* cited by examiner

ANTENNA CORE AND METHOD OF MANUFACTURING THE SAME, AND ANTENNA AND DETECTION SYSTEM USING THE SAME

CROSS-REFERENCE TO RELATED APPLICATIONS

This application is a division of and claims the benefit of priority under 35 U.S.C. §120 from U.S. Ser. No. 13/165,847 filed Jun. 22, 2011, which is a continuation of prior International Application No. PCT/JP2009/007045 filed on Dec. 21, 2009, which is based upon and claims the benefit of priority from Japanese Patent Application No. 2008-325826 filed Dec. 22, 2008; the entire contents of all of which are incorporated herein by reference.

FIELD

Embodiments described herein relate generally to an antenna core and a method of manufacturing the same, and an antenna and a detection system using the same.

BACKGROUND ART

In recent years, more and more cars are equipped with what is called a keyless entry system (or called a smart entry system) which enables the locking/unlocking only with a button, without a key being inserted into a cylinder. Communication of such a system mainly uses a radio wave in a 120 to 130 kHz frequency band. High frequency-band communication, if performed in the presence of a metal body such as in an automobile, is interfered by the metal body. This is why the keyless entry system uses a radio signal in the relatively low frequency band of 120 to 130 kHz.

It is known that a door handle of an automobile having a built-in antenna, and as its antenna core, a ferrite core is used. Though low-priced, the ferrite core has a problem of being easily broken due to its low impact resistance. Also it is known that an antenna core in which amorphous metal thin strips (magnetic alloy thin strips) exhibiting a more excellent magnetic property than a ferrite core are stacked via deformable members.

Generally, the amorphous metal thin strips are heat-treated so that they exhibit a desired magnetic property, but when heat-treated, the amorphous metal thin strips become extremely fragile. It is known that the antenna core is fabricated in such a manner that, after the amorphous metal thin strips are first heat-treated in an air atmosphere at 550° C. for one hour, 30 sheets of the thin strips in a stacked state are inserted in a mold, and with the use of epoxy resin, two-hour heating at 120° C. is conducted for curing or with the use of a urethane potting material, two-hour heating at 80° C. is conducted for curing. A work of inserting the laminate of 30 sheets of the amorphous metal thin strips into the mold is difficult because the amorphous metal thin strips heat-treated under the above condition are very fragile, which has a problem of poor manufacturing yields of the antenna core.

Further, since a thickness of the laminate of 30 sheets of the stacked amorphous metal thin strips each with a 20 μm thickness is 1.0 mm, a space factor of the magnetic alloy thin strips defined by [(thickness of each of the magnetic alloy thin strips)×(the number of the stacked sheets)÷(thickness of the laminate after the stacking)×100(%)] is 60%. In the antenna core having only such a space factor of the magnetic alloy thin strips, magnetic flux saturation is likely to occur to an excitation magnetic field, and therefore, it is not possible to realize reduction in size and thickness of the antenna core.

Also, it is known that an antenna core using a laminate of Fe-based amorphous metal thin strips. Fe-based amorphous metal is larger in magnetostriction than Co-based amorphous metal, and thus has a problem that its magnetic property easily deteriorates at the time of the stacking using adhesive resin, an impregnation liquid, or the like. In the keyless entry system, necessary antenna properties (communication properties) are an L value and a Q value. In Reference 3, the maximum (saturation) magnetic flux density is defined, but in the keyless entry system, the L value and the Q value are important. Even with a magnetic flux density to about the same degree as that of ferrite or Co-based amorphous metal, it basically suffices that the L value and the Q value are satisfied. Concretely, the L value decides a tuning (resonant) frequency and the Q value influences reception sensitivity at this time.

Since Fe-based amorphous metal has a problem of getting relatively easily rusted, it needs to be coated with an antirust especially when used in an on-vehicle application or a precision product such as a watch as is performed. This will be a factor of increasing manufacturing cost of the antenna core. Further, in this document, the heat-treatment temperature is 365° C. The heat-treatment at such a temperature makes the amorphous metal thin strips mechanically fragile and has an adverse effect on handling and yields during a stacking process.

It is known that heat-resistant resin or a precursor of the heat-resistant resin is applied on one surface or both surfaces of each thin strip of Fe-based amorphous metal, and the thin strips of the Fe-based amorphous metal are thereafter stacked, and then the laminate is hot-pressed at 300 to 450° C. for one hour or more. However, the laminate is often used mainly for rotors and stators of an electric motor and a power generator, and thus does not have a sufficient magnetic property as an antenna core used for the communication in the 120 to 130 kHz frequency band. The keyless entry system is also used in applications other than automobiles, such as the locking/unlocking of a door of a building, a security system, and the like, and uses a 40 to 150 kHz frequency band.

DETAILED DESCRIPTION

In one embodiment, an antenna core includes a laminate of a plurality of Co-based amorphous magnetic alloy thin strips in which a length ratio of a long axis to a short axis is greater than 1. 60% or more of the plural Co-based amorphous magnetic alloy thin strips in terms of the number of the thin strips as percentage each have a line-shaped mark formed along the long axis on at least one surface thereof.

Figure 1:
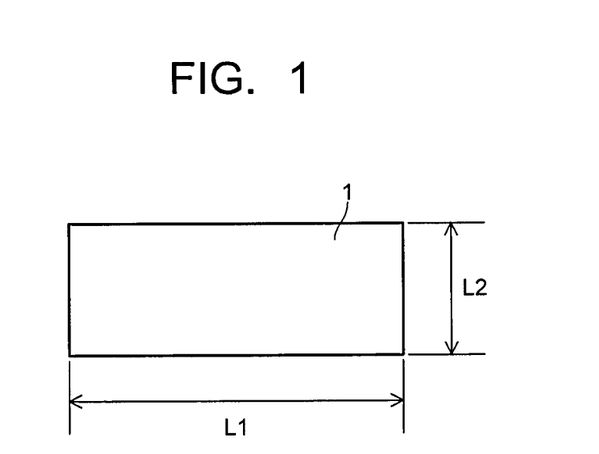
FIG. 1 is a plane view showing an example of a Co-based amorphous magnetic alloy thin strip according to an embodiment.

Hereinafter, embodiments will be described. An antenna core of this embodiment includes a laminate of a plurality of thin strips of a Co-based amorphous magnetic alloy. As shown in FIG. 1, the thin strip 1 of the Co-based amorphous magnetic alloy has a shape in which a ratio (L1/L2) of a length (L1) of its long axis to a length (L2) of its short axis is greater than 1. That is, the thin strip 1 of the Co-based amorphous magnetic alloy has a shape with L1/L2>1. The antenna core of this embodiment includes the laminate of the thin strips 1 of the Co-based amorphous magnetic alloy each having such a rectangular shape.

The thin strip 1 of the Co-based amorphous magnetic alloy only needs to have a cobalt (Co)-rich alloy composition (an alloy composition in which an element with the largest content in terms of atomic ratio is Co). Compared with iron (Fe), cobalt (Co) has a property of being higher in corrosion resistance and thus more resistant against rust (not easily rusted). Further, the Co-based amorphous alloy has properties of exhibiting excellent strength even if it is worked into a thin strip with a 10 to 30 μm average thickness and being not easily broken even if it is pressed or bent.

The thin strip 1 of the Co-based amorphous magnetic alloy preferably has a composition expressed by the following formula (1) in view of further improving its magnetic property.

General Formula: $Co_a D_b M_c Si_d B_e$ (1)

(in the formula, D is at least one element selected from Fe and Ni, M is at least one element selected from Ti, V, Cr, Mn, Cu, Zr, Nb, Mo, Ta, and W, and a, b, c, d and e are a+b+c+d+e=100 atomic %, and $1 \leq b \leq 10$, $0.3 \leq c \leq 6.5$, $5 \leq d \leq 12$, $1 \leq e \leq 8$)

The element D is an element effective for improving the magnetic property such as the maximum magnetic flux density. Further, adding the element D also improves mechanical strength of the magnetic alloy thin strip 1. From these points of view, the content of the element D preferably falls within a range of 1 to 10 atomic %. If the content of the element D is over 10 atomic %, the content of Co relatively reduces, which may possibly impair the property of the thin strip 1 of the Co-based magnetic alloy. The element M is an element effective for improving corrosion resistance and the like, and its content preferably falls within a range of 0.3 to 6 atomic %. Si and B are elements for promoting an amorphous state. Preferably, the content of Si falls within a range of 5 to 12 atomic % and the content of B falls within a range of 1 to 8 atomic %. The Co-based amorphous alloy having the composition expressed by the formula (1) has substantially zero magnetostriction, and thus is capable of reducing property deterioration of the antenna core even if later-described interlayer insulation using adhesive resin or impregnated resin is performed.

Figure 2:
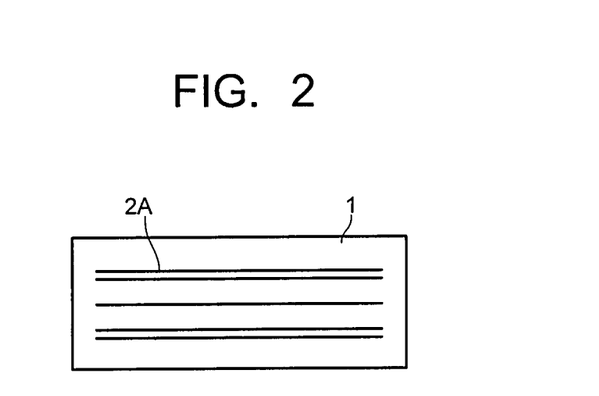
FIG. 2 is a plane view showing an example of line-shaped marks formed along a long-axis direction on a surface of the Co-based amorphous magnetic alloy thin strip.
Figure 3:
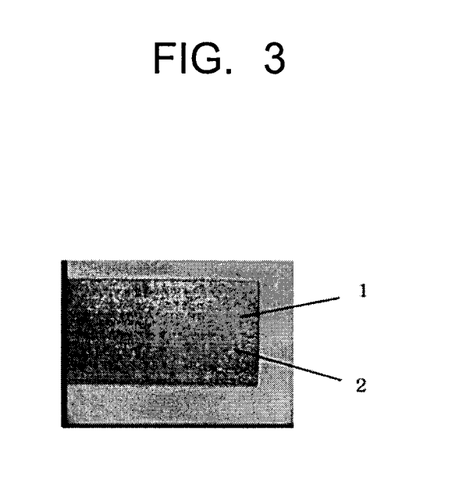
FIG. 3 is a photo showing an example of line-shaped marks formed along the long-axis direction on the surface of the Co-based amorphous magnetic alloy thin strip.

The thin strip 1 of the Co-based amorphous magnetic alloy has a line-shaped mark formed along the long axis on at least one surface. FIG. 2 shows line-shaped marks 2A formed along the long axis of the thin strip 1 of the Co-based amorphous magnetic alloy. FIG. 3 is a photo showing the surface of the thin strip 1 of the Co-based amorphous magnetic alloy having line-shaped marks 2 along the long axis. The line-shaped marks 2A need not be straight lines along the long axis and may wind to a moderate degree, but generally are straight lines. Using the thin strip 1 of the Co-based amorphous magnetic alloy having such line-shaped marks along the long axis makes it possible for the antenna core to have an improved property to a signal in a low-frequency band.

Here, the antenna core (laminate) does not have to be composed only of the thin strips 1 of the Co-based amorphous magnetic alloy having the line-shaped marks 2A along the long axis, and 60% or more of the thin strips 1 of the Co-based amorphous magnetic alloys forming the laminate in terms of the number of strips as percentage only need to have the line-shaped marks 2A along the long axis. According to the antenna core including such a laminate, it is possible to enhance a property to a signal in a low-frequency band. 80% or more of the thin strips 1 of the Co-based amorphous magnetic alloy in terms of the number of strips as percentage preferably have the line-shaped marks 2A along the long axis. It is especially desirable that all (100% in terms of the number of strips as percentage) of the thin strips 1 of the Co-based amorphous magnetic alloy composing the laminate have the line-shaped marks 2A along the long axis.

Figure 4:
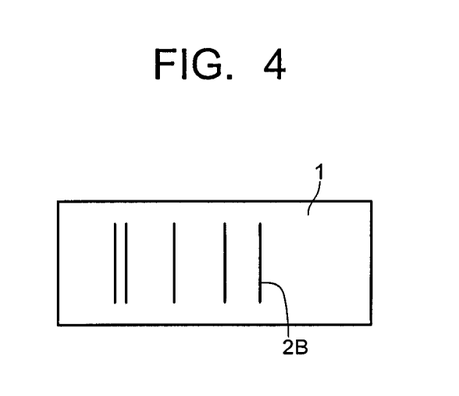
FIG. 4 is a plane view showing an example of line-shaped marks formed along a short-axis direction on the surface of the Co-based amorphous magnetic alloy thin strip.

As a magnetic alloy thin strip except the thin strips of the Co-based amorphous magnetic alloy 1 having the line-shaped marks 2A along the long axis, usable is the thin strip 1 of the Co-based amorphous magnetic alloy having line-shaped marks 2B formed along the short axis on at least one surface, for instance, as shown in FIG. 4. Further, the thin strip 1 of the Co-based amorphous magnetic alloy may be a magnetic alloy thin strip having a line-shaped mark formed in a direction other than the long-axis direction and the short-axis direction, a magnetic alloy thin strip not having a clear line-shaped mark, or the like, and the formation direction of the line-shaped mark and the present/absence of the line-shaped mark are not restrictive.

When the thin strips of the Co-based amorphous magnetic alloy not having the line-shaped mark along the long axis are used as 40% or less (the number of strips as percentage) of the thin strips 1 of the Co-based amorphous magnetic alloy forming the laminate, it is also preferable that the thin strips 1 of the Co-based amorphous magnetic alloy located in the outermost layers (a bottom layer and a top layer) on both sides of the laminate have the line-shaped marks 2A along the long axis. The magnetic alloy thin strips located in the outermost layers (the bottom layer and the top layer) have a great influence on the properties of the antenna core including the laminate of the magnetic alloy thin strips. Therefore, the thin strips 1 of the Co-based amorphous magnetic alloy located in the outermost layers preferably have the line-shaped marks 2A along the long axis.

A possible example of the line-shaped mark 2 is a mark formed on a roll surface when the thin strip 1 of the Co-based amorphous magnetic alloy is fabricated by a roll rapid cooling method. The thin strip 1 of the Co-based amorphous magnetic alloy is fabricated by the roll rapid cooling method that supplies molten metal onto a rapid-cooling roll rotated at high speed to rapidly cool the molten metal. As the roll rapid cooling method, a single-roll method and a twin-roll method have been known, and since the both use the rapid-cooling roll, a mark of the roll surface remains as a line shape on the obtained thin strip. In the case of the single-roll method, a line-shaped mark is likely to be formed also on a surface (free surface) opposite the roll surface. FIG. 2 and FIG. 3 show line-shaped marks 2 formed on the roll surface of the thin strip 1 of the Co-based amorphous magnetic alloy. The size of the line-shaped mark 2 is random but generally has a contrast high enough to be recognized by naked eyes.

An antenna is formed in such a manner that a winding is wound around the antenna core including the laminate of the thin strips 1 of the Co-based amorphous magnetic alloy. Generally, the winding is wound around the antenna core along a long-axis direction after the periphery of the antenna core is insulated. In this case, a magnetic field generated by a current flowing through the winding is applied in the long-axis direction of the antenna core. As a result of researches by the present inventors, it has been found out that the property of the antenna changes depending on whether the line-shaped mark extends in the long-axis direction or the short-axis direction. That is, by using the thin strip 1 of the Co-based amorphous magnetic alloy having the line-shaped marks 2A formed along the long axis on at least one surface, it is possible to enhance the property of the antenna having the antenna core around which the winding is wound in the long-axis direction. A conceivable reason for this is that the magnetic property of the antenna core is improved owing to a minute magnetic domain structure of the thin strip 1 of the Co-based amorphous magnetic alloy with respect to an external magnetic field.

The thin strip 1 of the Co-based amorphous magnetic alloy is not particularly limited, provided that the ratio (L1/L2) of the length (L1) of its long axis to the length (L2) of its short axis is greater than 1, but when the L1/L2 ratio is less than 2, the effect of improving the magnetic property is small. When the L1/L2 ratio is over 40, the shape of the antenna core becomes long and its practicability especially in small watch and keyless applications lowers. Further, positioning at the time of the stacking step is difficult and handlability lowers. Considering the improvement in magnetic property and handlability (manufacturability), the L1/L2 ratio of the thin strip 1 of the Co-based amorphous magnetic alloy preferably falls within a range of 2 to 40, more preferably within a range of 3 to 20.

Figure 5:
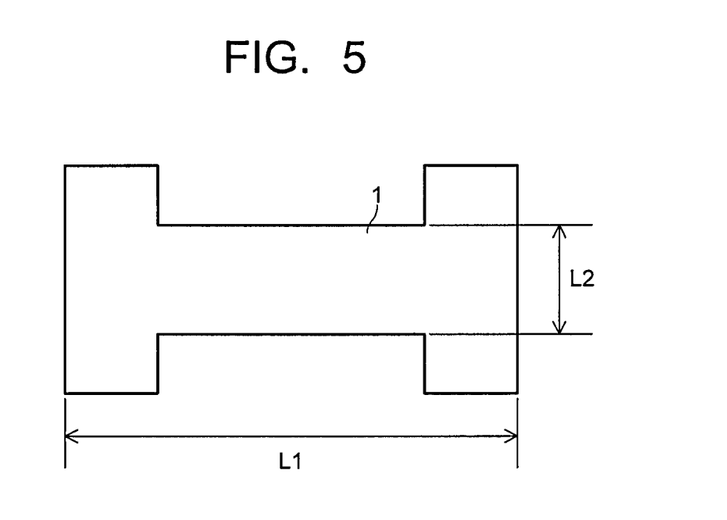
FIG. 5 is a plane view showing an other example of the Co-based amorphous magnetic alloy thin strip according to the embodiment.
Figure 6:
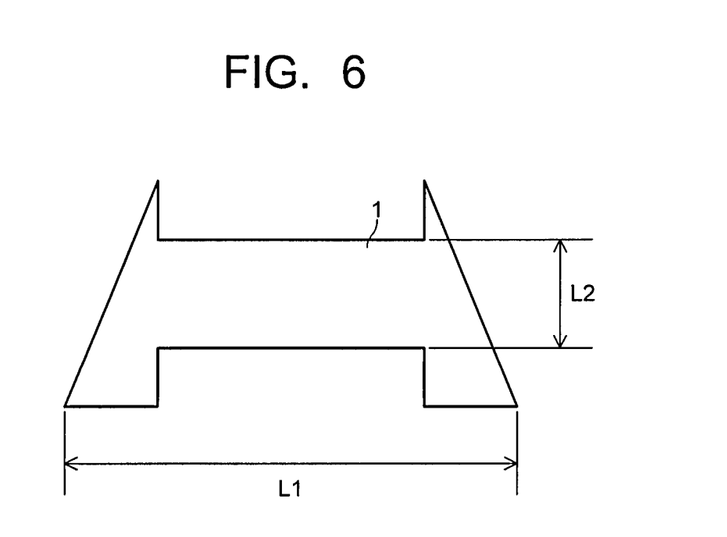
FIG. 6 is a plane view showing still another example of the Co-based amorphous magnetic alloy thin strip according to the embodiment.

The shape of the thin strip 1 of the Co-based amorphous magnetic alloy is not limited to the rectangle shown in FIG. 1 and may be H-shapes shown in FIG. 5 and FIG. 6. The antenna core including the laminate of the thin strips 1 of the Co-based amorphous magnetic alloy having the H-shape contributes to the improvement in the communication property of an antenna including the antenna core around which the winding is wound, and so on. The shape of the thin strip 1 of the Co-based amorphous magnetic alloy may be one whose corners are rounded so that press-punching easiness in the H-shape is improved, for instance. The shape of the thin strip 1 of the Co-based amorphous magnetic alloy may be elliptic or polygonal, which is not shown. In any case, the length L1 in the long-axis direction of the thin strip 1 of the Co-based amorphous magnetic alloy is the largest width of the thin strip and the length L2 in the short-axis direction thereof is the smallest width of the thin strip.

The number of the thin strips 1 of the Co-based amorphous magnetic alloy that are stacked is not particularly limited, but preferably falls within a range of 10 to 50. When an average thickness (thickness found from the dimension and mass of the thin strip and the density of the material) of the thin strip 1 of the Co-based amorphous magnetic alloy is 10 to 30 µm, if the number of the stacked strips is less than 10, there is a possibility that a sufficient magnetic property (the L value and the Q value) cannot be obtained. On the other hand, when the number of the stacked strips is over 50, the antenna core becomes too thick and is not adaptable to a reduction in thickness. Further, t1/t2 of the thin strip 1 of the Co-based amorphous magnetic alloy, where t1 is the largest thickness of the thin strip 1 of the Co-based amorphous magnetic alloy and t2 is the average thickness of the thin strip 1 of the Co-based amorphous magnetic alloy, preferably falls within a range of not smaller than 1 nor greater than 1.4.

The largest thickness t1 of the thin strip 1 of the Co-based amorphous magnetic alloy is the maximum value when the thickness of the thin strip 1 is measured by a micrometer. The average thickness t2 is a value found from the length L (mm) and the width W (mm) of the thin strip 1 and the density $\rho$ (mg/mm$^3$) of the Co-based amorphous alloy by the expression [$t2=W(W \cdot L \cdot \rho)$]. It is assumed that the density $\rho$ is found by the Archimedean method. The thin strip 1 of the Co-based amorphous magnetic alloy having the line-shaped marks 2 has minute irregularities on its surface. Too large irregularities cause an increase in thickness of the antenna core, a reduction in a space factor of the thin strips 1 of the Co-based amorphous magnetic alloy in the laminate, and so on. Therefore, t1/t2 of the thin strip 1 of the Co-based amorphous magnetic alloy is preferably 1.4 or less. t1/t2 more preferably falls within a range of 1.1 to 1.3.

Figure 7:
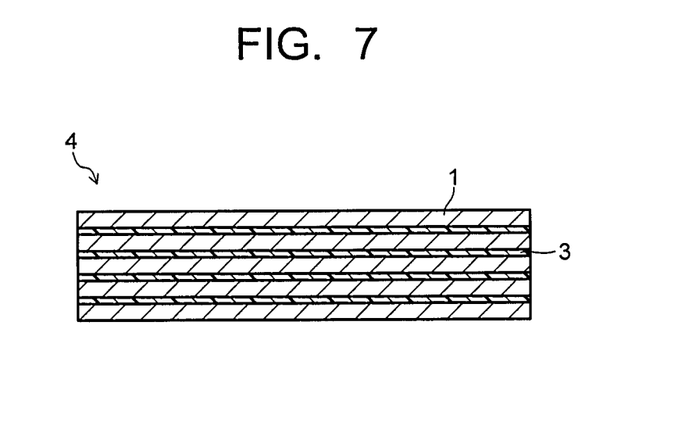
FIG. 7 is a cross-sectional view showing an antenna core according to an embodiment.

To form the antenna core, the thin strips 1 of the Co-based amorphous magnetic alloy are stacked. At this time, an insulating resin layer is preferably interposed between at least some of the thin strips 1 of the Co-based amorphous magnetic alloy. FIG. 7 shows an antenna core 4 having insulating resin layers 3 provided between the thin strips 1 of the Co-based amorphous magnetic alloy. The insulating resin is not particularly limited, provided that it is capable of interlayer insulation, but the use of hot-melting resin, for example, epoxy resin or polyimide resin, is preferable. For thermal welding at a temperature of 300° C. or lower, epoxy resin is suitable, and for thermal welding at temperatures higher than this temperature, polyimide resin is suitable.

The thickness of each of the insulating resin layers 3 preferably falls within a range of 1 to 5 µm. Further, T2/T1, where T1 is the thickness of the antenna core 4 and T2 is the total thickness of the insulating resin layers, preferably falls within a range of 0.1 to 0.4. T2/T1 less than 0.1 is liable to result in insufficient insulation performance. Further, when the number of the insulating resin layers 3 is small, an adhesive strength is weak and thus the strength of the laminate (antenna core) lowers, which is liable to cause exfoliation during the winding process. A possible method to prevent the exfoliation is to apply a stronger pressing force at the time of the stacking, but the strong pressing force lowers the L value and the Q value of the antenna core. When T2/T1 is over 0.4, the space factor of the thin strips 1 of the Co-based amorphous magnetic alloy in the antenna core decreases. The decrease in the space factor of the thin strips 1 of the Co-based amorphous magnetic alloy leads to a reduction in an effective sectional area as the antenna to cause a reduction in the L value and the Q value, which necessitates a size increase of the antenna.

According to the antenna core as described above, it is possible to obtain the maximum magnetic flux density of 0.35 to 1.2 T (tesla), for instance. Incidentally, applying heat treatment when necessary is also effective for improving the magnetic property. The heat treatment may be applied to the thin strips 1 of the Co-based amorphous magnetic alloy before they are stacked into the laminate or may be applied to the laminate. Further, when necessary, a bending work or the like may be applied to the thin strips 1 of the Co-based amorphous magnetic alloy.

Next, a method of manufacturing the antenna core according to an embodiment will be described. The method of manufacturing the antenna core of this embodiment is not particularly limited, provided that the antenna core includes the above-described structure. As the of manufacturing of the antenna core of this embodiment with good yields, the following manufacturing methods are adoptable A method of manufacturing an antenna core according to a first embodiment includes fabricating a long magnetic alloy thin strip by a roll rapid cooling method, cutting or press-working the long magnetic alloy thin strip to fabricate a plurality of magnetic alloy thin strips, so as to make a length direction of the long magnetic alloy thin strip become a long-axis side of the plural magnetic alloy thin strips, a length ratio of the long axis to a short axis of the plural magnetic alloy thin strips being greater than 1, forming a laminate by stacking the plural magnetic alloy thin strips, and impregnating with an insulating resin between the magnetic alloy thin strips in the laminate.

In the step of fabricating the long magnetic alloy thin strip by the roll rapid cooling method, material powders of Co and so on are first mixed so that an alloy composition becomes a predetermined value, and the mixture is melted into a molten alloy. The molten alloy is injected to a chill roll that rotates at high speed and the molten alloy is rapidly cooled at a speed of about $10^4$ to $10^{6\circ}$ C./second, whereby the long thin strip of the Co-based amorphous magnetic alloy (original material) is obtained.

A degree of the long-length of the magnetic alloy thin strip (original material) may be any, but the length preferably falls within a range of 2 to 15 km, in view of mass productivity. When the length is less than 2 km, only a small number of the thin strips are obtained at a time, which is not suitable for mass production. When the length is over 15 km, it takes a lot of trouble to take it up around a spool and the spool becomes too heavy after taking up the thin strip, leading to poor workability. Further, in order to inject the magnetic alloy thin strip with 15 km or more, a highly heat-resistant roll is necessary. The thickness and width of the magnetic alloy thin strip (original material) are adjusted by a shape and an injection pressure of a nozzle used for injecting the molten alloy.

The roll rapid cooling method includes a single-roll method and a twin-roll method. In either case, a line-shaped mark is formed on the roll surface of the obtained magnetic alloy thin strip. In the case of the single-roll method excellent in mass productivity, a line-shaped mark is likely to be formed also on a surface (free surface) opposite the roll surface. The line-shaped mark is visible to naked eyes. The line-shaped mark is a randomly reflected mark of a microscopic air layer entering between the molten alloy and the roll. The shape of the line-shaped mark is also random, but in general is formed substantially linearly along the length direction of the magnetic alloy thin strip, that is, along a rotation direction of the roll. It should be noted that the shapes of the line-shaped mark on the roll surface and the line-shaped mark on the free surface do not necessarily have to be the same.

Figure 8:
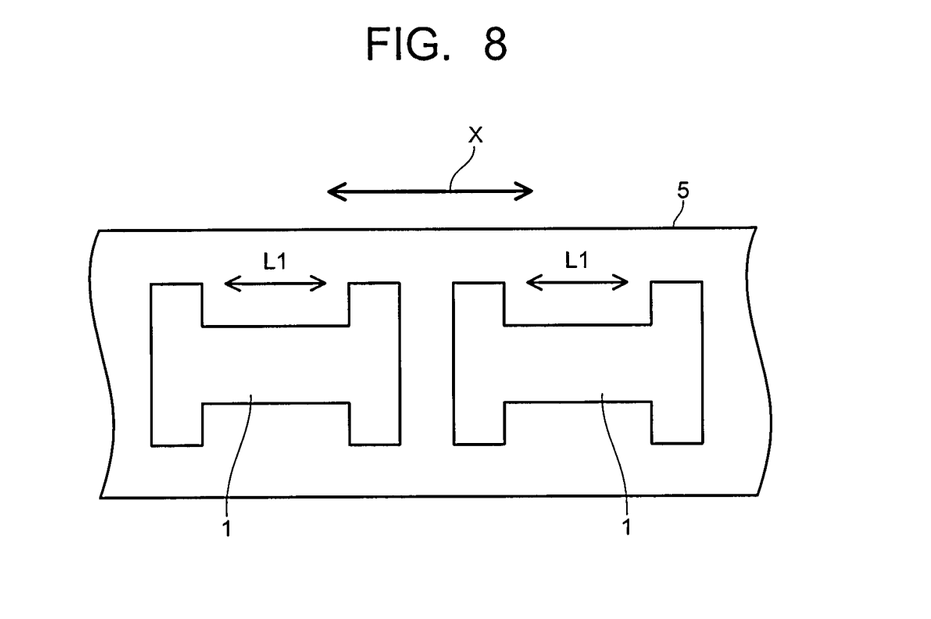
FIG. 8 is a plane view showing a step of fabricating the Co-based amorphous magnetic alloy thin strips from a long Co-based amorphous magnetic alloy thin strip in a manufacturing method of an embodiment.

Next, the obtained long magnetic alloy thin strip (original material) is taken up around the spool. The magnetic alloy thin strip (original material) is cut or press-worked while a predetermined amount thereof is supplied from the spool each time, whereby the plural magnetic alloy thin strips forming the laminate are fabricated. At this time, as shown in FIG. 8, the long magnetic alloy thin strip (original material) 5 is cut or press-worked so that the length direction (shown by the arrow X in FIG. 8) of the long magnetic alloy thin strip (original material) 5 becomes the long-axis (L1) side of the magnetic alloy thin strips 1, whereby the magnetic alloy thin strips 1 in each of which the ratio (L1/L2) of the length (L1) of the long axis to the length (L2) of the short axis is greater than 1 are fabricated. The cutting or press-working may be executed according to the L1/L2 ratio of the desired antenna core, and the following method can be a method for increasing mass productivity.

From the spool that has taken up the long magnetic alloy thin strip (original material), the magnetic alloy thin strip is fed, and the long magnetic alloy thin strip (original material) is slit according to a desired width of the short axis. In this process, long magnetic alloy thin strips with a narrow width are formed. Next, the long magnetic alloy thin strips with the narrow width are cut or press-worked according to the length of the long axis, whereby the magnetic alloy thin strips in a desired shape are obtained. For example, in a case of a rectangular magnetic core of 10×3 mm, if an original width of the long magnetic alloy thin strip is 50 mm, this is once slit into 3 mm width strips and the resultants are thereafter cut into 10 mm length strips. By cutting the plural long magnetic alloy thin strips with the narrow width after stacking them, it is possible to further efficiently obtain the magnetic alloy thin strips.

Next, a predetermined number of the obtained magnetic alloy thin strips are stacked to form the laminate. The insulating resin is impregnated between the layers of the laminate, whereby the intended antenna core is manufactured. As a method of impregnating with the insulating resin between the layers of the laminate, a method of immersing the laminate in a bath of the insulating resin, a method of coating side surfaces of the laminate with the insulating resin or its precursor, or the like can be employed. As the insulating resin, hot-melting resin such as epoxy resin or polyimide resin is preferably used.

In the case of the hot-melting resin, when a curing process at a predetermined temperature (heat treatment or drying process) follows the immersion in the bath of the insulating resin or the coating of the side surfaces of the laminate with the insulating resin or its precursor, the insulating resin enters between the layers to function as the insulating layer. The heat-treatment temperature in the curing process, though depending on a quality of resin, is roughly about 180 to 300° C. Epoxy resin, for example, is preferably heat-treated at a temperature of 180 to 220° C. for 1 to 3 hours. The insulating resin layer also functions as an adhesive layer, and therefore, the laminate having the insulating resin layers interposed between the layers has the structure in which the plural magnetic alloy thin strips are integrated, which improves the property and handlability of the antenna core. The thickness of each of the insulating resin layers preferably falls within the range of 1 to 5 μm as previously described.

A method of manufacturing an antenna core according to a second embodiment includes fabricating a long magnetic alloy thin strip by a roll rapid cooling method, covering at least one surface of the long magnetic alloy thin strip with insulating resin, cutting or press-working the long magnetic alloy thin strip to fabricate a plurality of magnetic alloy thin strips, so as to make a length direction of the long magnetic alloy thin strip become a long-axis side of the plural magnetic alloy thin strips, a length ratio of the long axis to a short axis of the plural magnetic alloy thin strips being greater than 1, and forming a laminate by stacking the plural magnetic alloy thin strips.

The step of fabricating the long magnetic alloy thin strip by the roll rapid cooling method is the same as that of the manufacturing method of the first embodiment. Next, at least one surface of the long magnetic alloy thin strip is covered with insulating resin. The used insulating resin is the same as that of the first embodiment. The insulating-resin coating step is executed in such a manner that the long magnetic alloy thin strip is fed from a spool, and this is immersed in a bath of the insulating resin or is coated with the insulating resin by a spray. An alternative applicable method may be to coat the long magnetic alloy thin strip with the insulating resin when the long magnetic alloy thin strip is fed from the spool.

The long magnetic alloy thin strip coated with the insulating resin is cut or press-formed so that its length direction becomes the long-axis side, whereby the magnetic alloy thin strips in which a ratio (L1/L2) of a length (L1) of the long axis to a length (L2) of a short axis is greater than 1 are fabricated. At this time, slitting the long magnetic alloy thin strip according to the width of the short axis to fabricate the long magnetic alloy thin strips with a narrow width as in the manufacturing method according to the first embodiment improves mass productivity. A predetermined number of the obtained magnetic alloy thin strips coated with the insulating resin are stacked and thereafter are heat-treated and dried, whereby the desired antenna core is manufactured.

As for which one of the first manufacturing method and the second manufacturing method is to be used, the second manufacturing method is preferably used when the number of the stacked strips are large, for example, "the number of the stacked strips is 20 or more" or when the short-axis width is large, for example, "the length (L2) of the short-axis is 3 mm or more". In the second manufacturing method, since the insulating resin is applied before the stacking, the insulating layers can be property formed between the layers even if the number of the stacked strips is large or the short-axis width is large, and they function as adhesive layers, so that strength of the antenna core is stabilized.

The antenna core may undergo heat treatment or a bending work when necessary. The heat treatment of the antenna core is conducted separately from the heat treatment for curing the insulating resin and its purpose is to improve the magnetic property. The heat-treatment condition is preferably 120 to 320° C.×0.5 to 3 hours. Further, when necessary, the heat treatment may be conducted in a magnetic field of 160 A/m or more, preferably in a magnetic field of 800 A/m or more. The heat treatment of the magnetic alloy thin strips for improving the magnetic property may come before they are stacked.

The bending work may come before the magnetic alloy thin strips are stacked or may come after the antenna core is formed. The bending work is effective when a mounting space of a detection system or the like where the antenna is mounted is small and thus the bending is required. The thin strip of the Co-based amorphous magnetic alloy has high strength and thus does not break even by the bending work such as folding into folio, for instance. Therefore, it is easily adaptable to the shape change ascribable to the bending work, which makes it possible to mount the antenna even in a curved mounting space.

Figure 9:
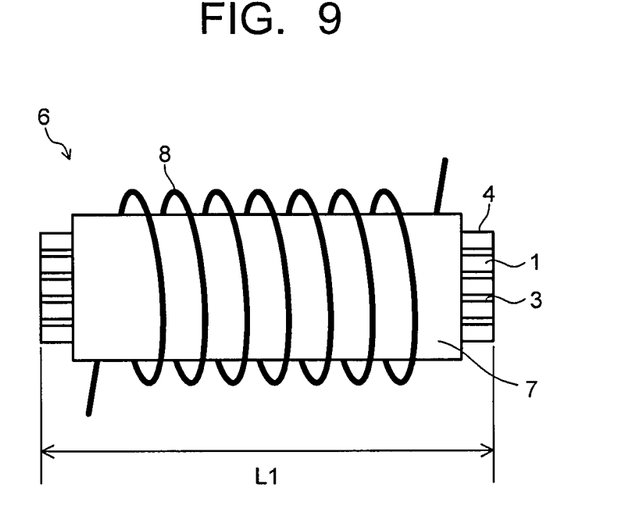
FIG. 9 is a front view showing an antenna according to an embodiment.

To form the antenna according to the embodiment, a winding is wound around the antenna core of the above-described embodiment along the long axis. As shown in FIG. 9, the antenna 6 includes the antenna core 4 including the laminate of the thin strips 1 of the Co-based amorphous magnetic alloy, and a winding 8 wound around its periphery via an insulating member 7. The winding 8 is wound around the antenna core 4 along the long axis. As the winding 8, an insulator-coated conductor is preferably used. The number of winding (the number of turns) depends on desired magnetic property and dimension, but is preferably 800 to 1500 turns, for instance.

In the antenna core 4, a part around which the winding is wound is covered by the insulating member 7 when necessary. As the insulating member 7, a resin coating, a resin film, an adhesive tape, a resin mold, a resin bobbin, or the like is usable. The insulating member 7 may be disposed so as to cover the whole antenna core 4, but in this embodiment, since the thin strips 1 of the Co-based amorphous magnetic alloy having good corrosion resistance are used, even the insulating member 7 covering only the part around which the winding is wound can prevent the occurrence of rust and so on. The thin strips 1 of the Co-based amorphous magnetic alloy may be partly exposed.

The antenna 6 of this embodiment is suitably used in a detection system, for instance. The detection system includes: a transmitter transmitting a specific radio signal such as a radio signal bearing its unique ID; and a receiver receiving the radio signal from the transmitter to detect that the transmitter is a specific one. The antenna 6 is applicable both to a transmitting antenna of the transmitter and a receiving antenna of the receiver, but is especially suitable as the receiving antenna. The receiver or the transmitter includes a card member, for instance. The receiving antenna or the transmitting antenna is disposed in the card member and is resin-sealed together with other components.

Being excellent in communication sensitivity in a 40 to 150 kHz frequency band, the antenna 6 is suitable for a detection system using a radio signal whose frequency is in a 40 to 150 kHz range. In particular, the antenna 6 exhibits a good communication property in a 120 to 130 kHz frequency band. Further, the antenna core 4 included in the antenna 6 is not fragile unlike a ferrite core and is not easily rusted unlike an antenna core using Fe-based amorphous alloy thin strips, and therefore, the antenna 6 is suitable for a detection system used in an environment loaded with a stress or in a humid environment. It should be noted that the antenna 7 is applicable not only to the receiving antenna of the receiver in the detection system but also to, for example, a receiving antenna of a radio-controlled clock, and especially to a receiving antenna of a radio-controlled wrist watch requiring downsizing, and the like.

Concrete examples of the detection system of this embodiment are an automobile detection system, a RFID tag system used for the management of various goods and the entry/exit management, and the like. An example of the automobile detection system is an automobile keyless entry system (or called a smart entry system). In the keyless entry system, a receiver is mounted on a wheel, a tire, a door, or the like, and a switch is turned on/off by a portable transmitter. Consequently, it is possible to turn on/off the locking of the wheel, the locking of the tire, the locking of the door, or the like without a key inserted into a cylinder. When the receiver is mounted on the tire, the system is usable as a detection system of a tire puncture sensor (TPMS: tire pressure monitoring system).

Since an automobile uses a metal body, the metal body interferes with the communication if the frequency of the radio signal is high. Therefore, a signal in a relative low frequency band of 40 to 150 kHz is used. Being excellent in the communication property in the 40 to 150 kHz frequency band, especially in a 120 to 130 kHz frequency band, the antenna of this embodiment is suitable for a detection system using a radio signal in this frequency band. The automobile application of the keyless entry system is described, but it is also applicable to security detection systems for motor cycles, bicycles, the locking/unlocking management of building doors, and so on, making use of a signal in the same frequency band.

EXAMPLES

Next, concrete examples of the present invention and evaluation results thereof will be described.

Examples 1 to 5

A long thin strip of a magnetic alloy (original material) made of a Co-based amorphous alloy with the composition of $Co_{80.95}Fe_{3.95}Nb_{2.8}Cr_{2.0}Si_{7.9}B_{2.4}$ was fabricated by the single-roll method. The long magnetic alloy thin strip (original material) is 7500 m in length, 33 mm in width, and 20 μm in average thickness. On a roll surface and a free surface of the long magnetic alloy thin strip, there were line-shaped marks formed along a length direction (rolling direction of a roll). The line-shaped marks were recognizable by naked eyes.

The obtained long magnetic alloy thin strip was slit into a 4 mm width strip, a 1.2 mm width strip, and a 0.8 mm width strip, and hoop members of the long magnetic alloy thin strips with the respective widths were fabricated. The hoop members with the respective widths were heat-treated under the condition of 210° C.×1 hour and thereafter were immersed in an epoxy resin liquid (thermosetting) and further dried, whereby the hoop members each having insulating resin layers whose thickness on one side was 2 μm were obtained. The hoop member with the 4 mm width (short axis) was cut into strips whose lengths (long axis) were 12 mm (example 1), 7.5 mm (example 2), and 15 mm (example 3). The obtained magnetic alloy thin strips all have line-shaped marks along the long axis. Then, the magnetic alloy thin strips with the respective lengths, 20 pieces for each, were stacked and thereafter subjected to curing heat-treatment under the condition of 200° C.×2 h, whereby antenna cores of the examples 1 to 3 were obtained.

Further, the hoop member with the 1.2 mm width was cut into 20 mm length strips. 20 pieces of such magnetic alloy thin strips were stacked and thereafter subjected to curing heat treatment under the condition of 200° C.×2 h, whereby an antenna core of the example 4 was obtained. The hoop member with the 0.8 mm width was cut into 29 mm length strips. 20 pieces of the above magnetic alloy thin strips, after being stacked, were subjected to curing heat-treatment under the condition of 200° C.×2 h, whereby an antenna core of the example 5 was obtained.

Comparative Example 1

Magnetic alloy thin strips with an insulating resin layer were prepared in the same manner as in the example 1 except that the original material is cut so that line-shaped marks formed on surfaces of the thin strips of the Co-based amorphous magnetic alloy extend in short-axis direction. They were obtained in such a manner that a long magnetic alloy thin strip similar to that of the example 1 was slit into a 12 mm width strip, and the resultant was cut into 4 mm length strips. 20 pieces of the magnetic alloy thin strips, after stacked, were subjected to curing heat treatment under the condition of 200° C.×2 h, whereby an antenna core was fabricated.

Regarding the antenna cores of the above-described examples 1 to 5 and comparative example 1, their maximum magnetic flux densities were measured. In the measurement of the maximum magnetic flux densities, used were magnetic cores with a closed magnetic circuit structure that were formed in such a manner that the aforesaid materials were formed into a toroidal shape (12 mm outside diameter×8 mm inside diameter) and they were treated under the same curing conditions. An applied magnetic field (direct current) was 800 A/m. Their measurement results are shown in Table 1.

TABLE 1

| | Shape of antenna core | | | | | Thickness of insulating layer | | | Maximum magnetic flux density (mT) |
|---|---|---|---|---|---|---|---|---|---|
| | Long axis (mm) | Short axis (mm) | Long axis/ Short axis | Line-shaped mark | T1 of magnetic Core (mm) | Thickness of each layer (mm) | Total thickness T2 (mm) | T2/T1 | |
| E1 | 12 | 4 | 3 | Long* | 0.44 | 2 | 0.08 | 0.18 | 550 |
| E2 | 7.5 | 4 | 1.88 | Long* | 0.44 | 2 | 0.08 | 0.18 | 550 |
| E3 | 15 | 4 | 3.75 | Long* | 0.44 | 2 | 0.08 | 0.18 | 550 |
| E4 | 20 | 1.2 | 25 | Long* | 0.48 | 3 | 0.12 | 0.25 | 550 |
| E5 | 29 | 0.8 | 36.25 | Long* | 0.48 | 3 | 0.12 | 0.25 | 550 |
| CE1 | 12 | 4 | 3 | Short** | 0.44 | 2 | 0.08 | 0.18 | 550 |

E1 to E5 = Example 1 to Example 5;
CE1 = Comparative Example 1;
Long* = Long-axis direction;
Short** = Short-axis direction Next, flanged insulating bobbins for housing the antenna cores of the examples 1 to 5 and the comparative example 1 were prepared. The insulating bobbins each have therein a through hole (inner cylinder) of 5×0.6 mm. Around its outer cylinder, an insulator-coated conductor 2UEW (0.1 mm diameter) was wound by 700 turns so as to cover a portion with a 7.4 mm width from the center of each of the insulating bobbins. The antenna cores of the examples 1 to 5 and the comparative example 1 were inserted into the bobbins to be disposed at the centers, whereby antennas were fabricated. As properties of these antennas, their L values and Q values were measured.

LCR meter 4192A (product name) manufactured by Agilent Technologies Inc. was used to measure the L values and the Q values. 60 kHz and 100 kHz frequencies were used, a set voltage was 0.1 V, and the measurement was conducted in a short-circuit mode. The results are shown in Table 2. Incidentally, the L values and the Q values (100 kHz) of insulated coils thereof in an air-core state were 9.36 μH and 18.9. At the time of the measurement, short zero of the LCR meter was conducted in the air-core state and thereafter the cores were inserted.

TABLE 2

| | 60 kHz | | 100 kHz | |
|---|---|---|---|---|
| | L value (mH) | Q value | L value (mH) | Q value |
| Example 1 | 4.45 | 183 | 4.60 | 125 |
| Example 2 | 2.87 | 15 | 2.88 | 16 |
| Example 3 | 4.82 | 186 | 4.89 | 127 |
| Example 4 | 5.22 | 304 | 5.42 | 126 |
| Example 5 | 6.96 | 130 | 7.29 | 68.1 |
| Comparative Example 1 | 4.45 | 163 | 4.60 | 110 |

Example 6

Along magnetic alloy thin strip (original material) similar to that of the example 1 was used, and this was press-worked into an H shape shown in FIG. 5. A length (L1) of its long axis was 16 mm, a length (L2) of its short axis, that is, a width of its center winding portion was 0.76 mm, a length of this portion was 10.2 mm, and a width of a flange of the H-shape was 2.9 mm. In the press-working, the long-axis direction of the H-shape and a direction of line-shaped marks formed on the magnetic alloy thin strips in the H-shape were made parallel to each other. The H-shaped magnetic alloy thin strips were used, they were stacked and subjected to resin curing as in the example 1, whereby an antenna core was fabricated.

Next, an insulating adhesive tape (10 mm width and 25 thickness) was wound around the center portion of the H-shaped antenna core (a lateral bar portion of the H-shape/ the portion with 0.76 mm width×10.2 mm length) by one turn and a half, and thereafter, an insulator-coated conductor with a 0.06 mm diameter was wound therearound by 1400 turns. In this manner, an antenna having the H-shaped antenna core around which the winding was wound was fabricated.

Example 7

A magnetic alloy thin strip made of a Co-based amorphous alloy with the composition of $Co_{79.25}Fe_{4.95}Ni_{3.55}Nb_{2.85}Si_{6.1}B_{3.3}$ was fabricated by the single-roll method, and except that this was used, an antenna having an H-shaped antenna core was fabricated in the same manner as in the example 6.

Comparative Example 2

An antenna having an H-shaped antenna core was fabricated in the same manner as in the example 6 except that an H-shape press-punching direction of a long magnetic thin strip was deviated by 90 degrees and the long magnetic alloy thin strip was worked so that a short-axis direction of the H-shape and line-shaped marks of the magnetic alloy thin strips became parallel.

Comparative Example 3

An antenna having an H-shaped antenna core was fabricated in the same manner as in the comparative example 2 except that a long magnetic alloy thin strip had the same composition as that of the magnetic alloy thin strip of the example 7.

Comparative Example 4

An antenna was fabricated in the same manner as in the comparative example 2 except that 2605SA1, which is a Fe-based amorphous, manufactured by Metaglass Inc. was used as a magnetic alloy thin strip being an original material.

Next, as properties of the antennas of the examples 6 to 7 and the comparative examples 2 to 3, their L values and Q values in 40 kHz were measured. A measuring method is as previously described. The measurement results are shown in Table 3.

TABLE 3

| | 40 kHz | |
|---|---|---|
| | L value (mH) | Q value |
| Example 6 | 19.95 | 87 |
| Example 7 | 20.12 | 85 |
| Comparative Example 2 | 19.94 | 75 |
| Comparative Example 3 | 20.01 | 66 |
| Comparative Example 4 | 14.25 | 8 |

Examples 8 to 11

Antenna cores were fabricated in the same manner as in the example 6 except that the antenna core fabricated in the example 6 was subjected to heat treatment shown in Table 4. Their maximum magnetic flux densities were found. Next, the same winding process as that of the example 6 was applied to the antenna cores, whereby antennas were fabricated. The L values and the Q values of these antennas in 40 kHz/0.1 V were measured. Further, it was checked whether or not a crack occurred when one magnetic alloy thin strip per each of the examples was bent by 180 degrees so that folding lines were made with substantially no space therebetween. Their results are shown in Table 4.

TABLE 4

| | Heat treatment condition (° C. × hour) | Antenna core Maximum magnetic flux density (mT) | Antenna L value (mH) | Q value | Result of bending test |
|---|---|---|---|---|---|
| Example 8 | 190° C. × 1 h | 550 | 19.98 | 88 | not cracked |
| Example 9 | 300° C. × 1 h | 555 | 19.65 | 38 | not cracked |
| Example 10 | 400° C. × 0.5 h | 560 | 20.02 | 41 | cracked |
| Example 11 | 440° C. × 0.5 h | 560 | 20.01 | 43 | cracked |

As is apparent from Table 4, by selecting the heat treatment condition, it is possible to further improve the properties. However, at a temperature of 400° C. or higher, a crack easily occurs because this temperature is close to a crystallization temperature. This is liable to have an adverse effect on manufacturing yields of the antenna core or cause a crack when a strong impact is applied. In view of the magnetic property and strength, the heat treatment temperature is preferably 300° C. or lower. In other words, when undergoing the bending work or when used in an environment loaded with a strong vibration, the antenna core is preferably heat-treated at a temperature of 300° C. or lower.

Examples 12 to 13

Antennas were fabricated in the same manner as in the example 6 except that the condition of the number of turns of the example 6 was changed to the conditions shown in Table 5. The L values and the Q values of these antennas in 40 kHz/0.1 V were measured. The measurement results are shown in Table 5. As is apparent from Table 5, the properties of the antenna can be adjusted depending on the condition of the number of turns in the antenna core.

TABLE 5

| | Antenna | | |
|---|---|---|---|
| | Winding (diameter, number of turns) | L value (mH) | Q value |
| Example 12 | 0.1 mm, 200 turns | 13.1 | 55.2 |
| Example 13 | 0.055 mm, 1425 turns | 20.0 | 63.8 |

Example 14

The antenna core fabricated in the example 1 was used, and an insulating tape with a 25 μm thickness was wound therearound by one turn, and thereafter an insulator-coated conductor with a 0.045 diameter was wound around the vicinity of the center of the long axis by 600 turns. The L value and the Q value of thus obtained antenna in 134.2 kHz/0.1V were measured. Further, a chip capacitor was connected in parallel to this, whereby an LC antenna component was fabricated. Incidentally, a capacity of the capacitor was set to 320 pF so that it tunes to a frequency of a keyless system (134.2 kHz).

Two sets of the above-described LC antenna components were prepared, and an X axis and a Y axis were formed by these. An air-core coil was used as a Z axis, and the resultant was disposed in a card-type insulated housing case of 14 mm×14 mm×14 mm to be sealed by epoxy resin. The resultant was mounted on an on-vehicle smart key and a communication operation was checked from a 2 m distance from an automobile. Further, the aforesaid smart key was given an impact in XYZ directions 6 times for each direction (totally 18 times) under the condition of 981 m/s$^2$ and 6 msec, and thereafter the communication operation was similarly checked. Whether or not the communication operation was possible in each test is shown in Table 6.

Comparative Example 5

One in which the antenna core in the smart key of the example 14 was changed to a ferrite core and the number of turns was adjusted so that the specification of the L value matched that of the example 14 was prepared. Communication properties of this smart key (before impact and after impact) were measured in the same manner as in the example 14. The measurement results are shown in Table 6.

TABLE 6

| | 134.2 kHz | | Communication operation | |
|---|---|---|---|---|
| | L value (mH) | Q value | Before impact | After impact |
| Example 14 | 4.4 | 33 | possible | possible |
| Comparative Example 5 | 4.4 | 29 | possible | not possible |

As is apparent from Table 6, owing to the strong impact resistance of the antenna core according to the example, a smart key using this can have an improved impact resistance. Therefore, it is possible to provide a keyless entry system excellent in reliability.

Examples 15 to 20

Antenna cores were fabricated in the same manner as in the example 1 except that the kind and the number of the magnetic alloy thin strips forming the laminate in the antenna core of the example 1 were changed to the conditions shown in Table 7. The number of the stacked magnetic alloy thin strips was 20 in all of them. Further, the largest thickness t1 and the average thickness t2 of each of the magnetic alloy thin strips were measured and t1/t2 was found. The results are shown in Table 7.

In each of the antenna cores of the examples 15 to 17, magnetic alloy thin strips having line-shaped marks along the long axis and magnetic alloy thin strips having line-shaped marks along the short axis are randomly stacked. In each of the antenna cores of the examples 18 to 20, a magnetic alloy thin strip having a line-shaped mark along the short axis is disposed at the center and magnetic alloy thin strips having line-shaped marks along the long axis are disposed on both sides thereof. Next, after a winding is wound around each of the antenna cores in the same manner as in the example 1, the L values and Q values in 60 kHz and 100 kHz were measured. The measurement results are shown in Table 8.

TABLE 7

| | Kind and number of thin strips | Long-axis ratio (%) | Stacking method | t1/t2 |
|---|---|---|---|---|
| E1 | line in long-axis direction × 20 strips | 100 | — | 1.1 |
| E15 | line in long-axis direction × 12 strips line in short-axis direction × 8 strips | 60 | random | 1.1 |
| E16 | line in long-axis direction × 16 strips line in short-axis direction × 4 strips | 80 | random | 1.1 |
| E17 | line in long-axis direction × 18 strips line in short-axis direction × 2 strips | 90 | random | 1.1 |
| E18 | line in long-axis direction × 6 strips line in short-axis direction × 8 strips line in long-axis direction × 6 strips | 60 | line in long-axis direction on outermost layers | 1.1 |
| E19 | line in long-axis direction × 8 strips line in short-axis direction × 4 strips line in long-axis direction × 8 strips | 80 | line in long-axis direction on outermost layers | 1.1 |
| E20 | line in long-axis direction × 9 strips line in short-axis direction × 2 strips line in long-axis direction × 9 strips | 90 | line in long-axis direction on outermost layers | 1.1 |

E1, E15, E16, E17, E18, E19, E20 = Example 1, Example 15, Example 16, Example 17, Example 18, Example 19, Example 20

TABLE 8

| | 60 kHz | | 100 kHz | |
|---|---|---|---|---|
| | L value (mH) | Q value | L value (mH) | Q value |
| Example 1 | 4.45 | 183 | 4.60 | 125 |
| Example 15 | 4.44 | 179.3 | 4.59 | 121.1 |
| Example 16 | 4.44 | 180.2 | 4.60 | 123.5 |
| Example 17 | 4.45 | 182.4 | 4.60 | 124 |
| Example 18 | 4.45 | 179.7 | 4.59 | 121.8 |
| Example 19 | 4.45 | 179.9 | 4.59 | 122 |
| Example 20 | 4.45 | 183 | 4.60 | 124.9 |

The antenna core according to the aspect of the present invention is effectively used in an antenna using a relatively low frequency band for the communication. The antenna according to the aspect of the present invention is effectively used as a receiving antenna of a receiver in a detection system, a receiving antenna of a radio-controlled watch, and the like. The detection system of the present invention is effective as a detection system for automobile and various kinds of securities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A detection system, comprising:
a transmitter transmitting a specific radio signal; and
a receiver including an antenna receiving the radio signal to detect the transmitter,
wherein the antenna comprises,
an antenna core including a laminate of a plurality of Co-based amorphous magnetic alloy thin strips in which a length ratio of a long axis to a short axis is greater than 1, and
a winding wound around the antenna core along the long axis, and
wherein 60% or more of the plural Co-based amorphous magnetic alloy thin strips in terms of the number of the thin strips as percentage each have a line-shaped mark formed along the long axis on at least one surface thereof.

2. The detection system according to claim 1,
wherein a frequency of the radio signal is in a range of not lower than 40 kHz nor higher than 150 kHz.

3. The detection system according to claim 1,
wherein the system is mounted on an automobile.

4. The detection system according to claim 1,
wherein the system is an automobile keyless entry system.

5. The detection system according to claim 1,
wherein the receiver includes a card member and the antenna which is resin-sealed in the card member.

6. The detection system according to claim 1,
wherein the Co-based amorphous magnetic alloy thin strips located in outermost layers on both sides of the laminate each have the line-shaped mark.

7. The detection system according to claim 1,
wherein the length ratio of the long axis to the short axis of the Co-based amorphous magnetic alloy thin strips is in a range of not less than 2 nor more than 40.

8. The detection system according to claim 1,
wherein t1/t2 ratio of the Co-based amorphous magnetic alloy thin strips is in a range of not less than 1 nor more than 1.4, where t1 is a largest thickness of each of the Co-based amorphous magnetic alloy thin strips, and t2 is an average thickness of each of the Co-based amorphous magnetic alloy thin strips.

9. The detection system according to claim 1,
wherein the Co-based amorphous magnetic alloy thin strips have an H-shape.

10. The detection system according to claim 2,
wherein the Co-based amorphous magnetic alloy thin strips have a composition expressed by a general formula:

wherein D is at least one element selected from the group consisting of Fe and Ni, M is at least one element selected from the group consisting of Ti, V, Cr, Mn, Cu, Zr, Nb, Mo, Ta, and W, and a, b, c, d and e are a+b+c+d+e=100 atomic %, and $1 \leq b \leq 10$, $0.3 \leq c \leq 6.5$, $5 \leq d \leq 12$, $1 \leq e \leq 8$.

11. The detection system according to claim 1,
wherein the line-shaped mark is a mark on a roll surface formed when the Co-based amorphous magnetic alloy thin strips are fabricated by a roll rapid cooling.

12. The detection system according to claim 1,
wherein the number of the stacked Co-based amorphous magnetic alloy thin strips is in a range of not less than 10 nor more than 50.

13. The detection system according to claim 1,
wherein the laminate has an insulating resin layer interposed between at least part of the Co-based amorphous magnetic alloy thin strips.

14. The detection system according to claim 1,
wherein a maximum magnetic flux density of the antenna core is in a range of not less than 0.35 T (tesla) nor more than 1.2 T (tesla).

* * * * *